Aug. 27, 1940.   G. C. COIL   2,213,101
CASH REGISTER
Filed Sept. 21, 1936   2 Sheets-Sheet 1
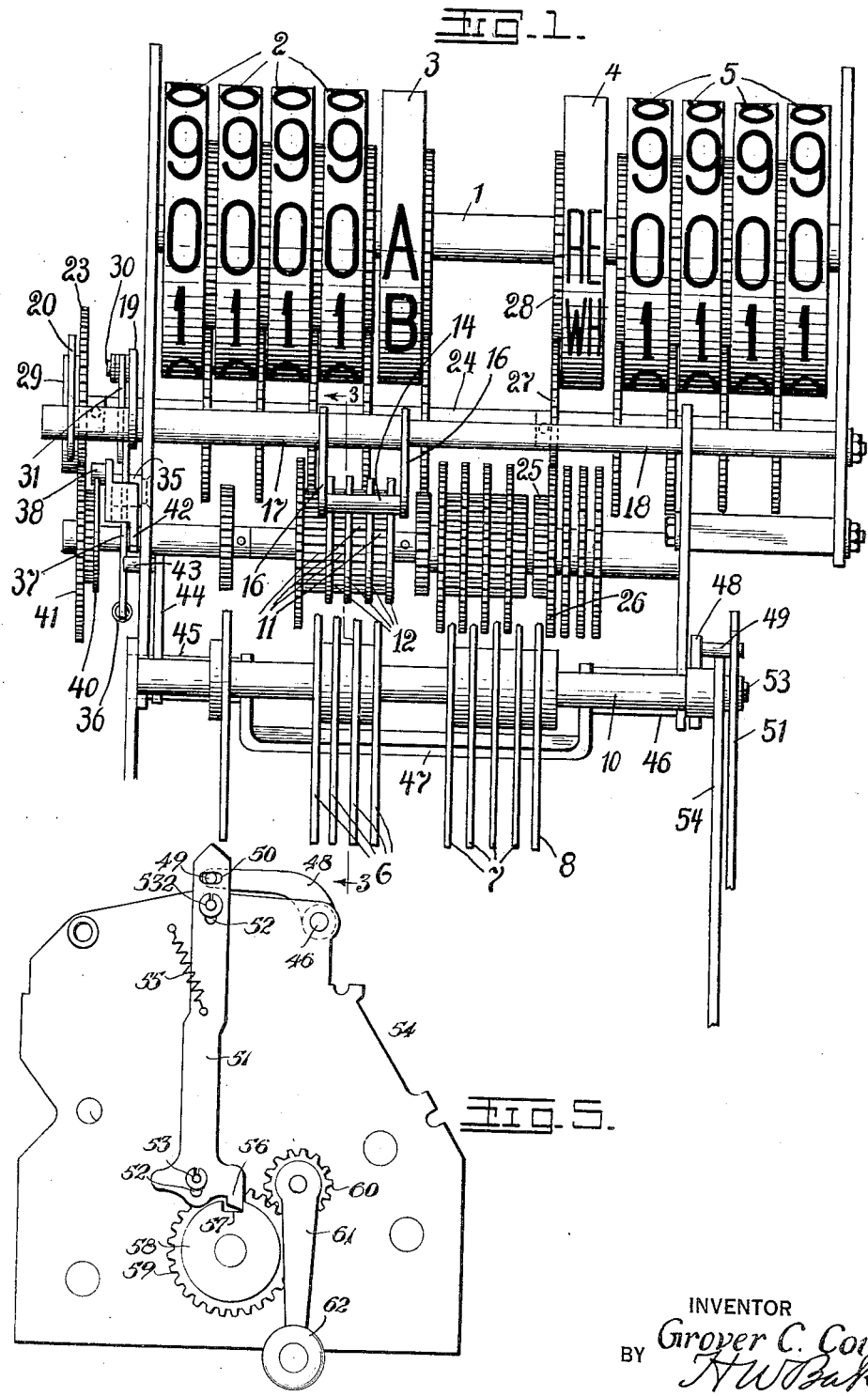
INVENTOR
Grover C. Coil
BY H W Baker
ATTORNEY Aug. 27, 1940.    G. C. COIL    2,213,101
CASH REGISTER
Filed Sept. 21, 1936    2 Sheets-Sheet 2

INVENTOR
Grover C. Coil
BY H. W. Baker
ATTORNEY

Patented Aug. 27, 1940

2,213,101

UNITED STATES PATENT OFFICE 2,213,101

CASH REGISTER

Grover C. Coil, Dayton, Ohio, assignor to Central National Bank of Cleveland, trustee Application September 21, 1936, Serial No. 101,741

19 Claims. (Cl. 235—130)

The object of this invention is to provide mechanism whereby any one of a plurality of transactions may be set up on the register and interlocking means to prevent the operation of certain keys when the said mechanism is set up to indicate one transaction and to release the said keys when the said mechanism is set to indicate another transaction.

More specifically the invention may be illustrated by a register having a transaction indicator to indicate a retail or a wholesale sale with means to prevent the operation of certain keys or levers when a retail sale is being made. I have shown the invention as applied to a cash register to be used in a liquor store where there are both retail sales and wholesale sales. I have provided an indicator to indicate whether a retail or a wholesale sale is being made and means to operate the said indicator. I have also provided four levers or keys to indicate the brand numbers of articles which might be sold by the liquor store. Each article which is sold by the store would be given a brand number and the said levers or keys should be set up to indicate on a retail sale what brand of liquor is being sold. I have also provided a clerk's indicator and an indicator to register the amount of the sale.

In the accompanying drawings and specification I show by way of illustration such a register with means to prevent the registration of a retail sale unless a brand number has been indicated and also means to prevent registering a brand number when a wholesale sale is being made. This is particularly advantageous to the auditing department.

Other objects and advantages will appear in the detail specification and claims which follow.

Referring to the drawings

Fig. 1 is a front elevational view of so much of the machine as is necessary to indicate the structure employed in this invention, the cabinet being removed for the sake of clearness;

Fig. 5 is a side elevational view of the lower part of the machine taken from the right-hand side of the view shown in Fig. 1.

Figure 3:
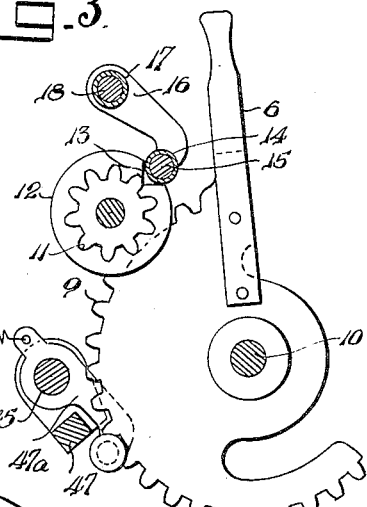
Fig. 3 is a detail view of a part of the interlocking mechanism, partly in cross section, and is taken on the line 3—3 of Fig. 1 looking in the direction of the arrows.

The invention is shown as applied to a cash register having printing type which is set up by various keys or levers, as shown in Patent 1,858,813, issued May 17, 1932, on an application filed by Albert S. Wheelbarger and Grover C. Coil. The machine is also provided with indicators as is shown by Patent 1,853,792, issued April 12, 1932, on an application filed by Albert S. Wheelbarger and Patent 1,762,904, issued June 10, 1930, on an application filed by Albert S. Wheelbarger, it being understood that the indicators shown in the present application are connected with the printing mechanism as shown in the said patents.

On the shaft 1 are positioned brand indicators 2, a clerk's indicator 3, a retail and wholesale indicator 4, and amount indicators 5, there being four indicators for the amount, one for the clerk, one for the retail and wholesale indicator, and four for the brand indicators, so that the machine can indicate amounts up to $99.99 and brand numbers up to 9999. Obviously, fewer or a larger number of indicators might be provided so as to indicate any amount or number of brands desired, and the several indicators may be arranged in any desired relative positions, the arrangement shown having been chosen for the convenience of illustration. Brand levers or keys 6 amount levers or keys 7, and a retail or wholesale lever or key 8 are connected to their respective indictors by the gearing shown in Patent 1,762,904, above named. As an illustration of this gearing, the brand lever 6 is connected to an arcuate gear 9 rotatably mounted on a shaft 10, which arcuate gear meshes with and drives a pinion 11, which through the gearing shown in the said Patent 1,762,904 is connected to its brand indicator 2. All of the other levers or keys are similarly connected with their indicators.

Secured to each of the four pinions 11 corresponding to the respective brand levers or keys is a disk 12 provided with a notch 13, the said notches being so positioned that when all of the brand levers are in their zero positions all of the notches 13 will be in alignment with each other and ready to receive a roller 14 carried by a shaft 15 which is supported by two arms 16, which arms are rigidly secured to a sleeve 17 mounted on a shaft 18. Secured to the sleeve 17 is a lever 19 and a locking lever 20 which carries a downwardly extending hook 21 adapted to be received within a notch 22 on a disk 29 secured to a gear 23, which gear is secured to a shaft 24. The lever 20 is urged in a clockwise direction by a spring 65.

Figure 2:
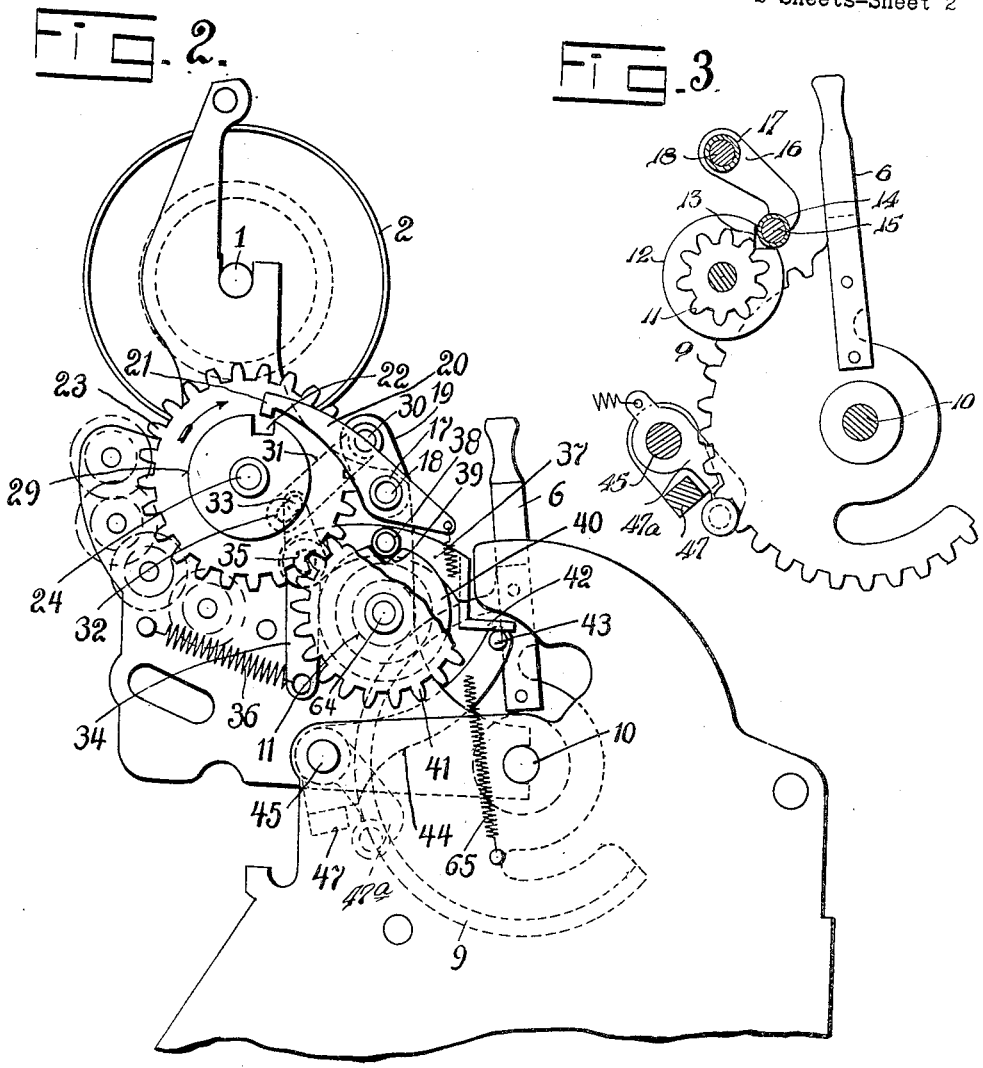
Fig. 2 is a side elevational view thereof, this view being taken from the left-hand side of the machine shown in Fig. 1.

The retail and wholesale lever 8 is, as above mentioned, provided with an arcuate gear which is a duplicate of the gear 9, which gear meshes with a pinion 25 secured to a gear 26 which meshes with and drives a pinion 27 secured to the said shaft 24, which pinion 27 meshes with and drives a gear 23 secured to the transaction indicator 4. The lever 8 has only two positions, one of which positions corresponds with the retail position and the other with the wholesale position. When the operator moves the lever 8 to indicate a retail sale, the indicator 4 shows the letters "RE" indicating "Retail" and the gear 27 has positioned the shaft 24 and gear 23 so that the notch 22 is immediately below the hook 21. If, however, he has moved the lever 8 so as to indicate a wholesale sale, the gear 23 is rotated in the direction of the arrow as shown in Fig. 2 so as to bring the notch 22 to the right beyond the hook 21 so that the lever 20 could not be rotated counter-clockwise. In other words, when the lever 8 is in position to indicate retail the lever 20 can be rotated so that the hook 21 will extend within the notch 22, but when the lever 8 is in wholesale position the periphery of the disk 29 prevents the rotation of any appreciable movement of the lever 20.

Figure 4:
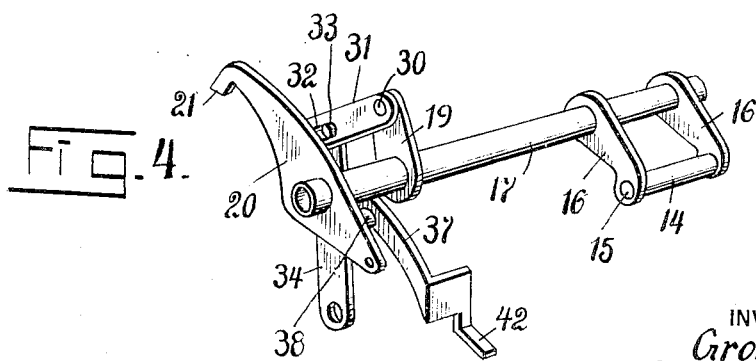
Fig. 4 is a perspective view of a part of the major assembly of the locking mechanism.

In making the retail sale and after positioning the lever 8 to indicate a retail sale, the operator is free to move the brand lever 6 to indicate the brand which is to be sold. In doing this he moves one or more of the levers 6 so as to indicate the brand number and thereby rotates the disk 12, moving the arm 16 in a counter-clockwise direction as viewed in Figs. 2, 3, and 4, and thereby moving the projection 21 into the notch 22. When the arm 16 is rotated in a counter-clockwise direction as above mentioned a similar movement is imparted to the lever 19 which carries a pin 30 on which is mounted a link 31 provided with a slot 32 which receives a pin 33 on a lever 34 which is mounted on a stud 35. The lever 34 projects downwardly beyond the stud 35 and the pin 33 is normally urged to the right-hand end of the slot 32 as viewed in Fig. 2 by means of a spring 36. Integral with the lever 34 is a lever 37 which carries a roller 38 which is adapted to be received, when the lever 8 is in retail position, within a notch 39 in a disk 40, which disk is secured to a gear 41 which is in mesh with the gear 23. The lever 37 has an off-set finger 42 which overlies a pin 43 carried by a lever 44 secured to a shaft 45, which shaft is connected to a shaft 46 by means of an off-set or U-shaped bar 47 which cooperates with aligning elements 47a to control the segmental gear 9, as will be hereinafter described. The shaft 46 has secured thereto a lever 48 (Fig. 5) which carries a pin 49 received within a slot 50 in a slide bar 51. The slide bar 51 is provided with guide slots 52 which receive guide studs 53 carried by the side wall 54 of the machine. The said slide bar 51 is normally urged upwardly by means of a spring 55. The slide bar is provided at its lower end with an off-set locking finger 56 which is normally received within a notch 57 carried by a disk 58 secured to a gear 59, which gear is driven by a pinion 60 operatively connected with a crank 61 which is rotated by means of a crank handle 62, thereby driving the main operating shaft 63 to which the disk 58 and gear 59 are secured. It is, therefore, obvious that the machine is normally locked by means of the finger 56 projecting within the notch 57 of the disk 58, but it is released if a brand number is set up for in setting up the brand number the arm 16 and lever 19 are rotated counter-clockwise as heretofore mentioned as viewed in Figs. 2, 3, and 4 and this movement of the lever 19 moves the link 31 to the left as viewed in Figs. 2 and 4, thereby rotating the levers 34 and 37 in an anti-clockwise direction and raising the finger 42 away from the pin 43 so that the lever 44 is rotated in an anti-clockwise direction by means of the spring 55, which lifts the finger 56 out of the notch 57. The machine can, therefore, be operated when the brand number has been set up provided it is a retail sale.

However, if the operator should attempt to set up a brand number when making a wholesale sale he would have moved the lever 8 to indicate that a wholesale sale is being made and would, therefore, have rotated the disk 29 so that the finger 21 cannot be projected into the notch 22. When the operator now attempts to set up a brand number it would be necessary for him to rotate the lever 20 in a counter-clockwise direction, but this is impossible for the finger 21 would lie on the periphery of the disk 29 and hence no brand number could be set up when a wholesale sale is being made.

Since the gear 23 meshes with and drives the gear 41, it is obvious that when the lever 8 is moved from the position shown in the drawings to indicate a wholesale sale the gear 41 is, therefore, rotated so as to move the notch 39 to a position where it cannot receive the roller 38 and the roller 38 is, therefore, cammed out of the said notch, raising the lever 37 and thereby, as above described, raising the locking finger 56 out of the notch 57 so that the machine can be operated. When the lever 37 is thus elevated it rotates the lever 34 anti-clockwise as viewed in Fig. 2 and moves the pin 33 to the left-hand end of the slot 32 as viewed in said figure. This pin and slot connection is necessary when the lever 8 is in its wholesale position for it will be remembered that the disk 29 has been rotated so that the locking finger 21 rests against the periphery of the disk 29. The lever 20, therefore, cannot rotate anti-clockwise when the lever 37 is cammed out of the notch 39 and hence it is necessary to provide the slot 32 in which the pin 33 can move when the lever 37 is lifted without moving the link 31 or rotating the lever 20.

When the transaction lever 8 and the brand or data lever 6 are in their normal or initial positions the transaction indicator will be set to indicate a retail transaction, and the brand or data indicating counters will be set at zero. If a retail sale is made the transaction setting lever 8 remains in its initial position and such of the brand setting levers 6 are actuated as may be necessary to set up the desired number on the brand indicators. The initial movement of the first brand setting lever to be actuate rotates the notched disk 12 which is associated with that lever and thus rocks the arms 16 and tubular shaft 17 about the axis of the latter, thereby moving the nose 21 of the locking member 20 into the notch 22 of the locking disk 29 and locking the shaft 24 and the transaction setting lever against movement. At the same time the arm 19 is rocked about the axis of the tubular shaft 17 to move the lever 34 against the action of the spring 36 and thus elevate the finger 42, thereby releasing the arm 44 and register locking member 51 for movement by the spring 55 to unlock the register operating mechanism. This movement of the arm 44 moves the bar 47 into engagement with or close to the aligning elements 47a to accurately align the several segments 9. However, this bar is yieldable against the action of the spring 55 and therefore does not prevent the adjustment of the segments after the register has been unlocked and before the register has been operated. The initial movement of the crank 61 of the operating mechanism moves the notch 57 of the locking disk 58 out of line with the nose 56 of the locking member 51 so that this nose will ride on or be arranged close to the peripheral edge of the disk, thereby locking the bar 47 in engagement with the aligning elements and positively preventing any further adjustment of any of the segments until the operation of the register has been completed and the crank 61 returned to its initial position. If the transaction is of a wholesale character the transaction setting lever is moved to a position to set the indicator 4 to indicate a wholesale transaction. This movement of the lever rotates the shaft 24 and disk 29 to move the notch 22 in the latter out of line with the nose 21 of the locking lever 20 and thereby lock that lever and the shaft 17, and in this manner locking the roller 14 in the notches of the disks 12 so that no movement can be imparted to the brand setting levers until the transaction setting lever has been again moved to its initial position, which in this embodiment of the invention is its retail position. Thus it will be apparent that the machine cannot be operated to register a retail sale until at least one of the brand setting levers has been actuated, and after initial movement has been imparted to one of the brand setting levers the transaction setting lever cannot be shifted; when the transaction setting lever is adjusted to register a wholesale transaction none of the brand setting levers can be actuated until the transaction setting lever is restored to its initial position; and after initial movement has been imparted to the register operating mechanism none of the setting levers can be actuated until the registering operation has been completed. It will be understood, of course, that the setting devices for the amount and clerk registering elements may be set at any time with relation to the setting of the transaction and data setting devices, prior to the initial movement of the register operating mechanism.

I realize that many changes may be made in the specific mechanism to accomplish the desired results without departing from the spirit of this invention. I, therefore, reserve to myself the right to make all changes which may fairly fall within the scope of the invention as set forth and desire to claim the same broadly except as I may limit myself in the attached claims.

I claim:

1. In a register, a transaction registering element, a device for setting said element to register one of a plurality of transactions, an element to register data relating to one of said transactions, a device for setting said data registering element, a device for locking said register against operation, means controlled by said transaction setting device to render said locking device operative when said setting device is set to register one transaction and to render said locking device inoperative when said setting device is set to register another transaction, means controlled by the setting device for said data registering element to render said locking device inoperative when said data setting device is actuated while said transaction setting device is set to register the first mentioned transaction, and means controlled by said transaction setting device to prevent the operation of said data setting device while said transaction setting device is set to register the last mentioned transaction.

2. In a register, a transaction registering element, a device for setting said element to register any one of a plurality of transactions, a group of elements to register data relating to one of said transactions, separate devices for setting the respective elements of said group, means controlled by said data setting devices to lock said transaction setting device against operation when any one of said data setting devices is in a position other than its initial position, means for locking said register against operation, and means controlled by the setting movement of any one of said data setting devices to render said register locking means inoperative.

3. In a register, a transaction registering element, a device for setting said element to register one of a plurality of transactions, a group of elements to register data relating to one of said transactions, separate devices for setting the respective data registering elements, a locking member connected with said transaction setting device to control the movement thereto, a second locking member, a normally operative lock for said register, and means controlled by the setting movement of any one of said data setting devices to render said register lock inoperative and to move said second locking member into locking relation to the first mentioned locking member.

4. In a register, a transaction registering element, a device for setting said element to register any one of a plurality of said transactions, a group of elements to register data relating to one of said transactions, separate devices for setting the respective elements of said group, a plurality of members connected with the respective data setting devices for movement therewith and having cam surfaces so arranged that they will be in alignment when said data setting devices are in their initial positions, a yieldable member normally engaging said surfaces, and means controlled by the movement of said transaction setting device to a position to register a transaction other than said one of said transactions for locking said yieldable member in engagement with said cam surfaces and thereby locking said data setting devices against movement.

5. In a register, a transaction registering element, a device for setting said element to register any one of a plurality of said transactions, a group of elements to register data relating to one of said transactions, separate devices for setting the respective elements of said group, a plurality of members connected with the respective data setting devices for movement therewith and having cam surfaces so arranged that they will be in alignment when said data setting devices are in their initial positions, a yieldable member normally engaging said surfaces, means controlled by the movement of said transaction setting device to a position to register a transaction other than said one of said transactions for locking said yieldable member in engagement with said cam surfaces and thereby locking said data setting devices against movement, a normally operative lock for said register, and means controlled by said movement of said transaction setting device for rendering said register lock inoperative.

6. In a register, a transaction registering element, a device for setting said element to register one of a plurality of transactions, an element to register data relating to one of said transactions, a device for setting said data registering element, a lock for said register comprising a locking member and a spring tending to move said member to unlocking position, a movable member connected with said locking member to control the movement of the latter by said spring, a spring actuated device acting on said movable member to hold said locking member normally in locking position, and means controlled by the movement of said data setting device to lock said transaction setting device against movement and to retract said spring actuated device and permit said locking member to move to unlocking position.

7. In a register, a transaction registering element, a device for setting said element to register one of a plurality of transactions, an element to register data relating to one of said transactions, a device for setting said data registering element, a lock for said register comprising a locking member and a spring tending to move said member to unlocking position, a movable member connected with said locking member to control the movement of the latter by said spring, a spring actuated device acting on said movable member to hold said locking member normally in locking position, and means controlled by the movement of said transaction setting device to a position to register a transaction other than said one of said transactions for locking said data setting device against movement and for retracting said spring actuated device and permitting said locking member to move to unlocking position.

8. In a register, a transaction registering element, a device for setting said element to register one of a plurality of transactions, an element to register data relating to one of said transactions, a device for setting said data registering element, means for operating said register, a normally operative device for locking said register against operation, means controlled by the respective setting devices for rendering said register locking device inoperative, means controlled by each of said setting devices for rendering the other setting device inoperative, and means controlled by the register operating means to lock both of said setting devices against movement during the operation of said register.

9. In a register, two registering elements adapted to register different subjects matter, separately operable actuating devices to set the respective registering elements, a locking device which is operative to lock the register against operation when both actuating devices are in their retracted positions, and means controlled by the movement of either actuating device from its retracted position to lock the other actuating device in its retracted position and to render said register locking device inoperative.

10. In a register, two registering elements adapted to register different subjects matter, separately operable actuating devices to set the respective registering elements, a locking device which is operative to lock the register against operation when both actuating devices are in their retracted positions, means controlled by the movement of either actuating device from its retracted possition to render said register locking device inoperative, and a second locking device having relatively movable parts connected with the respective actuating devices for movement thereby and so arranged that the movement of either actuating device from its retracted position will move that part which is connected therewith to a position to lock the other part and its actuating device against movement.

11. In a register, two registering elements adapted to register different subjects matter, separately operable actuating devices to set the respective registering elements, a locking device which is operative to lock the register against operation when both actuating devices are in their retracted positions, a normally inoperative locking device for said actuating devices, connections between the last mentioned locking device and the respective actuating devices whereby the movement of either actuating device from its retracted position will cause said locking device to lock the other actuating device in its retracted position, and means controlled by said connections to render said register locking device inoperative.

12. In a register, two registering elements adapted to register different subjects matter, separately operable actuating devices to set the respective registering elements, a locking device for said actuating devices comprising a rotatable disk having a notch and a locking member having a part movable into and out of said notch, means to cause said disk to move with one of said actuating devices and to retain said notch in line with said part of said locking member when said actuating device is in its retracted position, a second disk connected with the other of said actuating devices for rotation thereby and having a notch, an arm connected with said locking member and having a part arranged to enter the notch of said second disk when the last mentioned actuating device is in its retracted position and to be moved out of said notch and thereby cause said part of said locking member to enter the notch in the first mentioned disk when said last mentioned actuating device is moved from its retracted position.

13. In a register, a transaction registering element, a device for setting said element to register one of a plurality of transactions, an element to register data relating to one of said transactions, a device for setting said data registering element, a locking member separate from and connected with said transaction setting device for movement therewith, a second locking member adapted to operatively engage the first mentioned locking member when said transaction setting device is in its retracted position, and means controlled by the setting movement of said data setting device to move said second locking member into operative engagement with the first mentioned locking member and thereby lock said transaction setting device in said predetermined position.

14. In a register, a transaction registering element, a device for setting said element to register any one of a plurality of transactions, a group of elements to register data relating to one of said transactions, separate devices for setting the respective elements of said group, a rotatable locking member connected with said transaction setting device for movement therewith and having a notch, a second locking member having a part adapted to enter said notch, and means operable by the setting movement of any one of said data setting devices to move said part of said second locking member into the notch in said first mentioned locking member when said transaction setting device is in its retracted position, said means operating to retain said data setting devices in their retracted positions when said notch is moved out of the path of said part and said second locking member is held against movement.

15. In a register, a registering element, a device for setting said element in a selected registering position, a group of registering elements, separately operable devices for setting the respective elements of said group in selected registering positions, two normally inoperative locking members, each member being movable to a position to lock the other member against movement, means for connecting one of said locking members with the first mentioned setting device for movement therewith and to retain said first mentioned setting device in its retracted position when said locking member is locked against movement, and a device connected with the second locking member and with the last mentioned setting devices and including means operable by the movement of any one of said last mentioned setting devices to move said second locking member into locking relation to the first mentioned locking member and to retain all of said last mentioned setting devices in their retracted positions when said second locking member is locked against movement.

16. In a register, a registering element, a device for setting said element in a selected registering position, a group of registering elements, separately operable devices for setting the respective elements of said group in selected registering positions, a disk having a notch, means for connecting said disk with the first mentioned setting device for rotation thereby, a locking member having a part adapted to enter the notch in said disk, and means for actuating said locking member comprising a device arranged to be actuated by the movement of any one of the last mentioned setting devices from its retracted position to move said locking member into the notch of said disk and lock said first mentioned setting device against movement from its retracted position, said actuating device also serving to retain all of said last mentioned setting devices in their retracted positions when said first mentioned setting device has been moved from its retracted position and a portion of said disk obstructs the movement of said locking member.

17. In a register, a registering element, a device for setting said element in a selected registering position, a group of registering elements, separately operable devices for setting the respective elements of said group in selected registering positions, a disk having a notch, means for connecting said disk with the first mentioned setting device for movement therewith, a pivoted locking member having a part movable into said notch to lock said disk against movement, the movement of said disk by said first mentioned setting device serving to bring a portion of said disk into the path of said part and lock said pivoted locking member against movement, a pivoted device connected with said pivoted locking member for movement therewith, and members connected with the respective last mentioned setting devices for movement therewith and engaging said pivoted device to hold said last mentioned setting devices against movement when said pivoted locking member is locked against movement and to actuate said pivoted locking member when any one of said last mentioned setting devices is moved from its initial position.

18. In a register, a registering element, a device for setting said element in a selected registering position, a group of registering elements, separately operable devices for setting the respective elements of said group in selected registering positions, two normally inoperative locking members, each member being movable to a position to lock the other member against movement, means for connecting one of said locking members with the first mentioned setting device for movement therewith and to retain said first mentioned setting device in its retracted position when said locking member is locked against movement, and a device connected with the second locking member and with the last mentioned setting devices and including means operable by the movement of any one of said last mentioned setting devices to move said second locking member into locking relation to the first mentioned locking member and to retain all of said last mentioned setting devices in their retracted positions when said second locking member is locked against movement, a normally operative device to lock said register against operation, and means controlled by the operative movement of either of said locking members to render said register locking device inoperative.

19. In a register, a registering element, a device for setting said element in a selected registering position, a group of registering elements, separately operable devices for setting the respective elements of said group in selected registering positions, a gear connected with the first mentioned setting device for rotation thereby, a locking member connected with said gear for rotation therewith, a pivoted locking member to cooperate with the first mentioned locking member, each locking member being movable to a position to lock the other member against movement, means actuated by the movement of any one of the last mentioned setting devices from its retracted position to move said pivoted locking member into locking relation with the first mentioned locking member, said means also serving to retain said last mentioned setting devices in their retracted position when said pivoted locking member is locked against movement, a normally operative device for locking said register against operation, a second gear driven by the first mentioned gear, a disk secured to said second gear and having a peripheral notch, an arm connected with said pivoted locking member for movement therewith and for movement with relation thereto, said arm having a part seated normally in the notch in said disk and movable by the rotation of said disk, and means controlled by the movement of said arm to render said register locking device inoperative.

GROVER C. COIL.